(12) United States Patent
Okazaki et al.

(10) Patent No.: US 11,769,980 B2
(45) Date of Patent: Sep. 26, 2023

(54) AMPLIFICATION FIBER AND LASER BEAM EMITTING APPARATUS

(71) Applicants: Tomoya Okazaki, Nagakute (JP); Kazuya Saito, Nagoya (JP); Edson Haruhico Sekiya, Nagoya (JP)

(72) Inventors: Tomoya Okazaki, Nagakute (JP); Kazuya Saito, Nagoya (JP); Edson Haruhico Sekiya, Nagoya (JP)

(73) Assignees: TOYOTA JIDOSHA KABUSHIKI KAISHA, Toyota (JP); TOYOTA SCHOOL FOUNDATION, Nagoya (JP)

( * ) Notice: Subject to any disclaimer, the term of this patent is extended or adjusted under 35 U.S.C. 154(b) by 240 days.

(21) Appl. No.: 17/178,720

(22) Filed: Feb. 18, 2021

(65) Prior Publication Data
US 2021/0265800 A1    Aug. 26, 2021

(30) Foreign Application Priority Data

Feb. 21, 2020 (JP) ................................ 2020-028687
Jan. 12, 2021 (JP) ................................ 2021-002824

(51) Int. Cl.
*H01S 3/00* (2006.01)
*H01S 3/067* (2006.01)

(52) U.S. Cl.
CPC ...... *H01S 3/06783* (2013.01); *H01S 3/06716* (2013.01); *H01S 3/06779* (2013.01)

(58) Field of Classification Search
None
See application file for complete search history.

(56) References Cited

U.S. PATENT DOCUMENTS 6,151,429 A     11/2000  Kristensen et al.
2021/0376551 A1* 12/2021  Gattass ............... H01S 3/06716

FOREIGN PATENT DOCUMENTS

| EP | 1873874 A2 * | 1/2008 | ......... H01S 3/06708 |
| JP | 2010050126 A * | 3/2010 | ............... H01S 3/10 |
| JP | 2010-080927 A | 4/2010 | |
| WO | 2007/127356 A2 | 11/2007 | |
| WO | 2021/034873 A2 | 2/2021 | |

OTHER PUBLICATIONS

S.A. Wade et al., "Fluorescence intensity ratio technique for optical fiber point temperature sensing", Journal of Applied Physics, Oct. 15, 2003, vol. 94, No. 8, pp. 4743-4756 (14 pages).

* cited by examiner

*Primary Examiner* — Mark Hellner
(74) *Attorney, Agent, or Firm* — Sughrue Mion, PLLC

(57) ABSTRACT

An amplification fiber which can generate a laser beam in a visible region even when a silica glass is used as a base material of a core of the amplification fiber is realized. An amplification fiber according to an embodiment of the present disclosure includes a core configured to generate a laser beam from an excitation beam in a visible region, and a cladding surrounding the core. The core is composed of a core material including Dy, one or more elements selected from Al, Ge, and P, and a silica glass.

8 Claims, 6 Drawing Sheets a laser apparatus disclosed in Japanese Unexamined Patent Application Publication No. 2010-80927 includes an excitation beam source for emitting an excitation beam having a wavelength of 340 to 500 nm, an oscillation fiber through which the excitation beam passes to generate a laser beam, a first reflecting mirror disposed at one end of the oscillation fiber, and a second reflecting mirror disposed at the other end of the oscillation fiber.

AMPLIFICATION FIBER AND LASER BEAM EMITTING APPARATUS

CROSS REFERENCE TO RELATED APPLICATIONS

This application is based upon and claims the benefit of priority from Japanese patent applications No. 2020-028687, filed on Feb. 21, 2020, and No. 2021-002824, filed on Jan. 12, 2021, the disclosures of which are incorporated herein in its entirety by references.

BACKGROUND

The present disclosure relates to an amplification fiber and a laser beam emitting apparatus. The present disclosure relates to, for example, an amplification fiber including a core for generating a laser beam from an excitation beam in a visible region and a cladding surrounding the core, and a laser beam emitting apparatus using the amplification fiber.

Recently, a machining apparatus using laser beams has been used. Such laser beams are amplified and then emitted. For example, a laser apparatus disclosed in Japanese Unexamined Patent Application Publication No. 2010-80927 includes an excitation beam source for emitting an excitation beam having a wavelength of 340 to 500 nm, an oscillation fiber through which the excitation beam passes to generate a laser beam, a first reflecting mirror disposed at one end of the oscillation fiber, and a second reflecting mirror disposed at the other end of the oscillation fiber.

The oscillation fiber in the laser apparatus disclosed in Japanese Unexamined Patent Application Publication No. 2010-80927 includes a core for generating a laser beam from the excitation beam. The core of such an oscillation fiber uses a fluoride glass or a fluoride crystal as a base material. Any one of $Er^{3+}$, $Ho^{3+}$, $Sm^{3+}$, $Tm^{3+}$, $Dy^{3+}$, $Eu^{3+}$, $Tb^3$, and $Nd^{3+}$ is added to this base material.

SUMMARY

The applicants have found the following problem. Theoretically, the laser apparatus disclosed in Japanese Unexamined Patent Application Publication No. 2010-80927 can oscillate laser beams in the visible region. However, a fluoride glass or a fluoride crystal used as the base material of the core of the oscillation fiber does not have sufficient resistance to an increase in the output power of visible light.

The present disclosure has been made in view of such a problem, and it is possible to realize an amplification fiber and a laser beam emitting apparatus which can generate a laser beam in a visible region even when a silica glass is used as a base material of a core of the amplification fiber.

An example aspect of the present disclosure is an amplification fiber including:
a core configured to generate a laser beam from an excitation beam in a visible region; and
a cladding surrounding the core.
The core is composed of a core material including:
Dy;
one or more elements selected from Al, Ge, and P; and
a silica glass.
With such a configuration, while the silica glass is used as a base material of the core of the amplification fiber, the laser beam in the visible region can be generated.

In the above amplification fiber,
atomic ratios of the core material are preferably Al/Dy: 0 to 135.1, Ge/Dy: 0 to 309.5, and P/Dy: 0 to 408.5.

In the above amplification fiber,
the atomic ratios of the core material are preferably Al/Dy: 5.4 to 12.6 and Ge/Dy: 6.2 to 58.6.

In the above amplification fiber, the core material preferably further includes one or more elements selected from Ce, F, and OH.

The above amplification fiber is preferably configured to generate the laser beam including a wavelength band of 480 to 600 nm.

In the above amplification fiber, the excitation beam preferably includes a wavelength of 400 to 460 nm.

Another example aspect of the present disclosure is a laser beam emitting apparatus including:
a light source configured to emit an excitation beam in a visible region; and
the above amplification fiber through which the excitation beam passes to generate a laser beam.
With such a configuration, while using a silica glass as a base material of the core of the amplification fiber, the laser beam in the visible region can be generated.

The above laser beam emitting apparatus preferably further includes:
a first reflecting mirror disposed at one end of the amplification fiber; and
a second reflecting mirror disposed at another end of the amplification fiber to face the first reflecting mirror.
It is preferable that the excitation beam pass through the amplification fiber to thereby generate the laser beam, and
the laser beam be repeatedly reflected between the first reflecting mirror and the second reflecting mirror to be oscillated.

In the above laser beam emitting apparatus, the light source is preferably a blue laser diode is configured to emit the excitation beam of 400 to 460 nm.

In the above laser beam emitting apparatus, the laser beam preferably includes a wavelength band of 480 to 600 nm.

According to the present disclosure, it is possible to realize an amplification fiber and a laser beam emitting apparatus which can generate a laser beam in a visible region even when a silica glass is used as a base material of a core of the amplification fiber.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, specific embodiments to which the present disclosure is applied will be described in detail with reference to the drawings. However, the present disclosure is not limited to the following embodiments. In order to clarify the description, the following description and drawings are appropriately simplified.

First Embodiment

Figure 1:
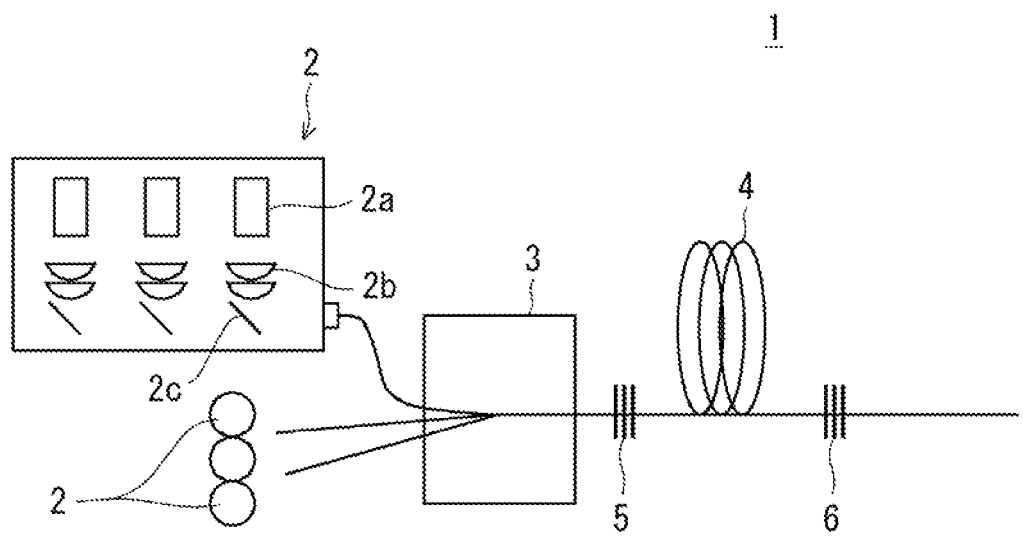
FIG. 1 schematically shows a laser beam emitting apparatus according to a first embodiment.

First, a basic configuration of a laser beam emitting apparatus using an amplification fiber according to this embodiment will be described. FIG. 1 schematically shows the laser beam emitting apparatus according to this embodiment. The laser beam emitting apparatus 1 according to this embodiment includes a light source unit 2, an excitation beam combiner 3, an amplification fiber 4, a first reflecting mirror 5, and a second reflecting mirror 6.

The light source unit 2 includes one or more sets (e.g., three sets) of light sources 2a, lenses 2b, and mirrors 2c. The light source 2a emits an excitation beam in a visible region. The light source 2a is, for example, a blue laser diode and emits the excitation beam having a wavelength of 400 to 460 nm. The excitation beam emitted from the light source 2a is emitted to the excitation beam combiner 3 via the lens 2b and the mirror 2c. The laser beam emitting apparatus 1 according to this embodiment may include at least one such light source unit 2.

The excitation beams emitted from the plurality of light sources 2a are incident on the excitation beam combiner 3. The excitation beam combiner 3 focuses the plurality of excitation beams so as to emit the excitation beams to the amplification fiber 4. However, when there is only one light source 2a, the excitation beam combiner 3 may be omitted.

Figure 2:
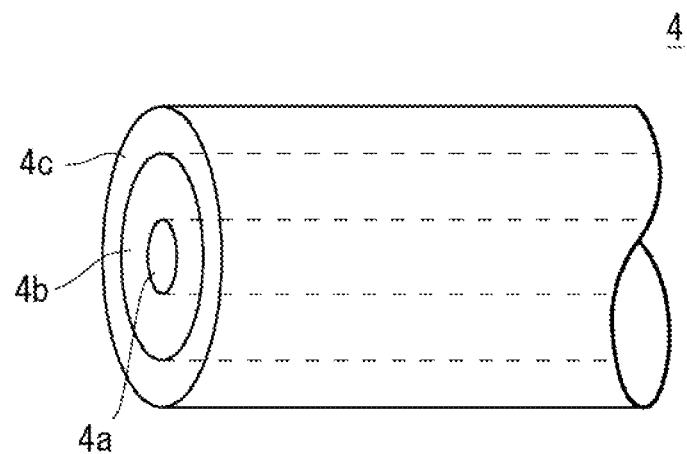
FIG. 2 shows a configuration of an amplification fiber according to the first embodiment.

The amplification fiber 4 generates a laser beam from the excitation beam incident from the excitation beam combiner 3, which will be described in detail later. FIG. 2 shows a configuration of the amplification fiber according to this embodiment. As shown in FIG. 2, the amplification fiber 4 includes a core 4a, a first cladding 4b, and a second cladding 4c.

The core 4a, whose detailed composition will be described later, is composed of a core material including a silica glass ($SiO_2$) as a base material, Dy as a fluorescent agent, and at least one of Al, Ge, and P as a dispersant. The first cladding 4b surrounds a peripheral surface of the core 4a and is made of a silica glass. The second cladding 4c surrounds a peripheral surface of the first cladding 4b and is made of a silica glass. The peripheral surface of the second cladding 4c is surrounded by a resin layer, thereby ensuring the mechanical strength of the amplification fiber 4.

The first reflecting mirror 5 is disposed at one end of the amplification fiber 4 on the side of the excitation beam combiner 3. The first reflecting mirror 5 is an Fiber Bragg Grating (FBG) which transmits excitation beams and totally reflects laser beams. The second reflecting mirror 6 is disposed at the other end of the amplification fiber 4. The second reflecting mirror 6 is an FBG which reflects a part of the laser beam and transmits the remaining part of the laser beam.

In such a laser beam emitting apparatus 1, when the excitation beams are emitted from the respective light sources 2a of the light source unit 2, the plurality of excitation beams are incident on the excitation beam combiner 3. The excitation beam combiner 3 focuses the plurality of excitation beams and emits them to the amplification fiber 4 via the first reflecting mirror 5.

The excitation beam incident on the amplification fiber 4 is reflected at the interface between the first cladding 4b and the second cladding 4c and is absorbed by Dy of the core 4a while propagating to the other end of the amplification fiber 4. In this way, the core 4a of the amplification fiber 4 generates the laser beam. The generated laser beam is repeatedly reflected between the first reflecting mirror 5 and the second reflecting mirror 6 to be oscillated, and is output with high power.

Next, the amplification fiber 4 according to this embodiment will be described in detail. The amplification fiber 4 according to this embodiment includes the core for generating the laser beam from the excitation beam and the claddings surrounding the core. The core is composed of the core material including Dy, one or more elements selected from Al, Ge, and P, and the silica glass.

Recently, the motorization has been rapidly advanced, and copper has become the main material of batteries and electric components such as motors. Laser beam machining is the most suitable machining method for electric components, because it can machine a large number of parts and the number of parts of the electric component is large. However, efficient and stable laser beam machining cannot be conducted on copper materials, because the optical absorption rate of copper is about a few % at the wavelength of a laser for machining according to the related art.

In order to apply a laser beam emitting apparatus using an amplification fiber to a laser for machining, the present inventors have studied high output power laser beams. However, some fibers using a fluoride glass or a fluoride crystal as a base material do not have sufficient resistance to light intensity. The present inventors have also studied an amplification fiber capable of amplifying light in the visible region using a silica glass in view of light resistance.

However, when a silica glass is used, the non-radiative relaxation rate of a rare earth element tends to increase in comparison with that of a fluoride glass or the like. This leads to preventing the sufficient maintaining of the excited state of the rare earth element, and thus a high output power laser beam may not be obtained in some cases. Although such a problem is not so serious when an infrared laser is used, it has become a big problem when short wavelengths (visible to ultraviolet region) are used.

As a result of intensive study, the present inventors have found that, by selecting Dy as the rare earth element to be doped in the silica glass of the core and combining Dy with one or more elements selected from Al, Ge, and P, the increase in the non-radiative relaxation rate is suppressed and the laser beam in the visible region is output even when the base material is the silica glass.

As described above, according to this embodiment, it is possible to achieve the amplification fiber 4 capable of emitting a laser beam in the visible region expected to improve the light absorption rate using the silica glass, which is commonly used as the base material of the core, as the base material of the core 4a.

The core 4a of the amplification fiber 4 according to this embodiment includes the silica glass as the base material, Dy as the fluorescent agent, and at least one of Al, Ge, and P as the dispersant. The core 4a of the amplification fiber 4 according to this embodiment may further include Ce, F, and OH, and may further include other elements to the extent that the above effect is not impaired. Hereinafter, each component doped in the silica glass will be described in order.

Dy is a component that absorbs the excitation beams and outputs the laser beams by stimulated emission. By using Dy, it is possible to absorb the excitation beams of 400 to 460 nm in the visible region, and to output high power laser beams in the visible region, especially laser beams having a wavelength band of 480 to 600 nm.

The content of Dy may be appropriately adjusted within the range to achieve the above effect. Within the range, with respect to the core material 100 wt % including the additive component, the content of Dy is preferably 0.01 to 2 wt %, more preferably 0.07 to 0.93%, and still more preferably 0.46 to 0.93 wt %. When the content of Dy is 0.01 wt % or more, the laser beam can be satisfactorily generated. On the other hand, when the content of Dy is 2 wt % or less, the concentration quenching is suppressed.

Al suppresses aggregation of Dy and satisfactorily disperses Dy. The content of Al may be appropriately adjusted within the range to achieve this effect. Within the range, with respect to the core material 100 wt % including the additive component, the content of Al is preferably 0.1 to 2 wt %, more preferably 0.15 to 1.57 wt %, and still more preferably 0.4 to 0.54 wt %. When the content of Al is 0.1 wt % or more, Dy can be satisfactorily dispersed in the silica glass. On the other hand, when the content of Al is 2 wt % or less, photodarkening caused by Al is suppressed, the content of Ge described later can be reduced, and Numerical Aperture (NA) of the amplification fiber 4 can be reduced.

Ge is a component that suppresses the photodarkening. The content of Ge may be appropriately adjusted within the range to achieve this effect. Within the range, with respect to the core material 100 wt % including the additive component, the content of Ge is preferably 0.88 to 10 wt %, more preferably 1 to 10 wt % or 0.88 to 9.68 wt %. The content of Ge is more preferably 1.8 to 2.18 wt %. When the content of Ge is 1 wt % or more, the photodarkening can be effectively suppressed. On the other hand, when the content of Ge is 10 wt % or less, the generation of structural defects in the silica glass caused by Ge is suppressed, and the output of the laser beams becomes stable. Furthermore, when Ge is used in combination with Al, the photodarkening caused by Al can be suppressed.

Like Al, P is a component capable of suppressing the aggregation of Dy. Since bonding with Oxygen hole centers (OHCs) in the silica glass is less likely to occur than such bonding in Al, P is used in combination with Al to suppress the photodarkening caused by Al—OHCs. On the other hand, Al is more effective in suppressing the aggregation of Dy than P, and thus the content of P may be 0 wt % as long as the content of Al is within the above range. In view of the above, with respect to the core material 100 wt %, the content of P is preferably 0 to 6 wt %, more preferably 0 to 2 wt %.

In the amplification fiber 4 according to this embodiment, the core 4a may further include Ce, F, and OH. Ce has the effect of suppressing the photodarkening by the valence of Ce being changed by the excitation beam, and the content of Ce is preferably, for example, 0 to 1 wt %. Further, F has an effect of cutting off the silica network and suppressing the photo darkening, and the content of F is preferably, for example, 0 to 3 wt %. OH has the effect of cutting off the silica network and suppressing the photodarkening, and the content of OH is preferably, for example, 0 to 1 wt %. Here, OH represents the OH group of Si—OH disposed at the end of the silica glass.

If the core 4a does not include Tb, the laser oscillation by the laser beam emitting apparatus 1 is stabilized, which is preferable. Specifically, with respect to the core material 100 wt %, the content of Tb is preferably limited to 0 to 0.20 wt %, more preferably to 0 to 0.10 wt %.

When the core 4a includes Dy, Ge, and Al, the laser oscillation by the laser beam emitting apparatus 1 is stabilized, which is preferable.

As described above, in the amplification fiber 4 and the laser beam emitting apparatus 1 according to this embodiment, the core 4a of the amplification fiber 4 includes the silica glass as the base material, Dy as the fluorescent agent, and at least one of Al, Ge, and P as the dispersant. Therefore, while the silica glass is used as the base material of the core 4a of the amplification fiber 4, the laser beam in the visible region (e.g., 480 to 600 nm) can be generated from the excitation beam.

Further, in the amplification fiber 4 according to this embodiment, the silica glass, which is used as a base material of a core of a common resonance fiber, is used as the base material of the core 4a. For this reason, the laser beam emitting apparatus 1 that can output high power laser beams can be realized at a low cost.

Furthermore, the light source 2a according to this embodiment is required to have a high power and the price thereof is required to be realistic. The use of a blue laser diode makes it possible to realize the laser beam emitting apparatus 1 that can output high power laser beams at a low cost.

Second Embodiment

Figure 3:
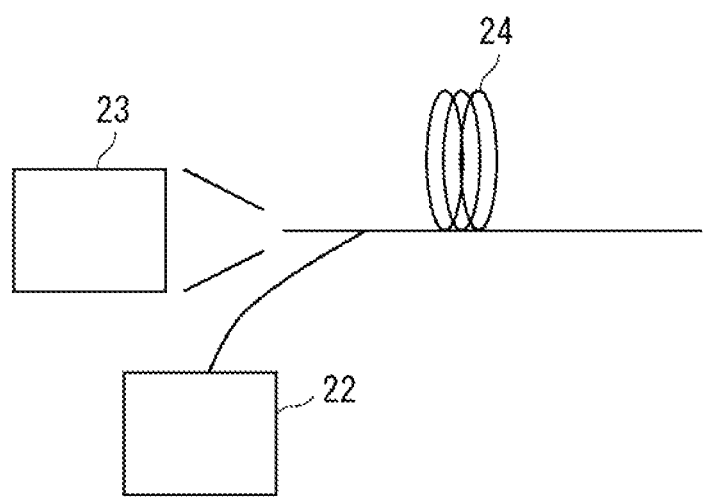
FIG. 3 schematically shows a laser beam emitting apparatus according to a second embodiment.

FIG. 3 schematically shows a laser beam emitting apparatus according to this embodiment. As shown in FIG. 3, a laser beam emitting apparatus 21 according to this embodiment is configured to emit a laser beam without resonating the laser beam. Specifically, the laser beam emitting apparatus 21 includes a light source unit 22, a seed light source 23, and an amplification fiber 24.

The light source unit 22 has the same configuration as that of the light source unit 2 according to the first embodiment, and emits an excitation beam in the visible region. A seed beam is emitted from the seed light source 23. The amplification fiber 24 has the same configuration as that of the amplification fiber 4 according to the first embodiment. The amplification fiber 24 absorbs the excitation beam of the light source unit 22 incident from one end thereof, amplifies the light from the seed light source 23 also incident from one end thereof, and emits the amplified light from the other end thereof.

Also in such a laser beam emitting apparatus 21, the core of the amplification fiber 24 includes a silica glass as a base material, Dy as a fluorescent agent, and at least one of Al, Ge, and P as a dispersant. Therefore, while the silica glass is used as the base material of the core of the amplification fiber 24, the laser beam in the visible region can be generated from the excitation beam.

Example 1

In Example 1, the core of the amplification fiber had a composition of 0.46 wt % Dy, 0.54 wt % Al, and 1.80 wt %

Ge. This amplification fiber was used in the laser beam emitting apparatus 1 according to Example 1 to emit an excitation beam in the visible region from the light source 2a.

Figure 4:
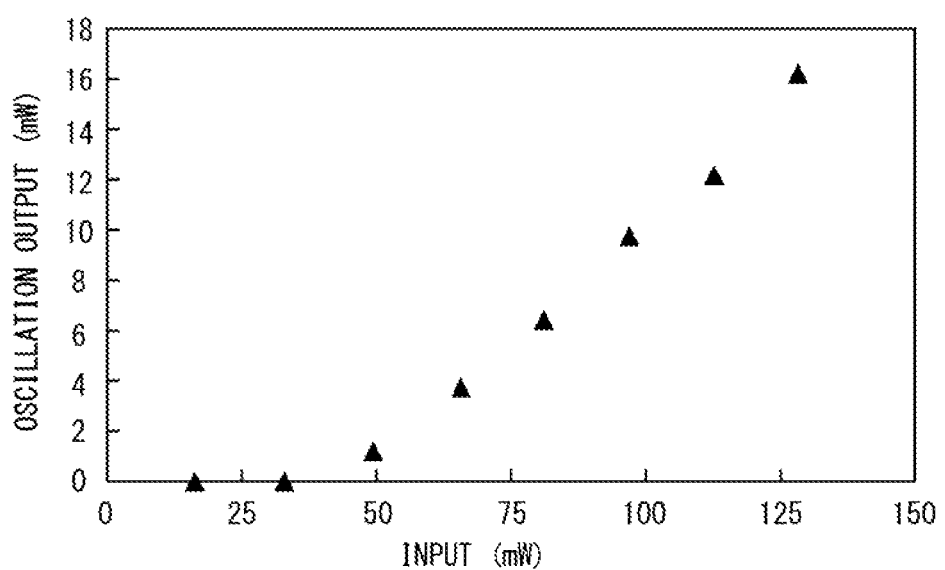
FIG. 4 is a graph showing a relationship between an input of an excitation beam and an oscillation output of a laser beam according to Example 1.
Figure 5:
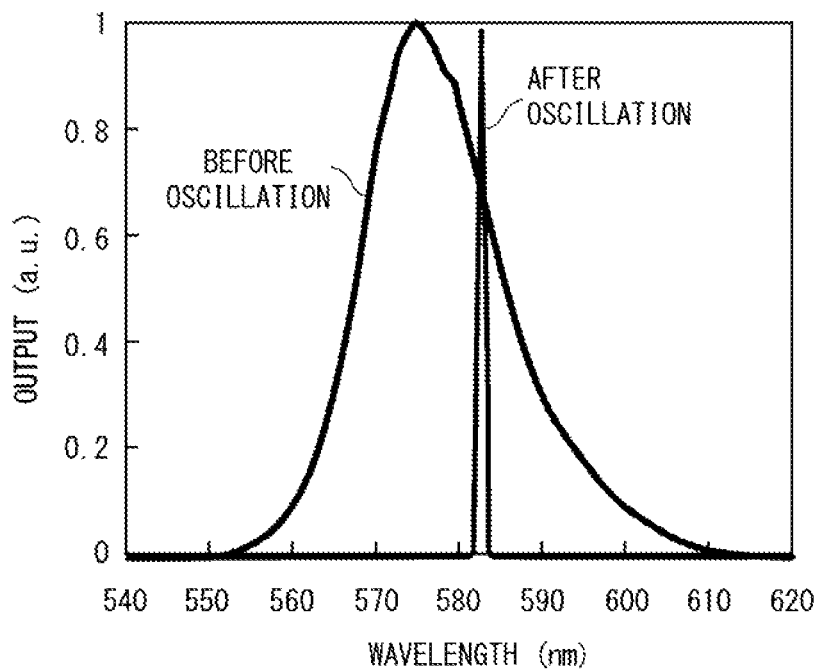
FIG. 5 is a graph showing a relationship between a wavelength before and after oscillation of the laser beam and the output thereof according to Example 1.

As a result, as shown in FIGS. 4 and 5, when the input of the excitation beam was 40 nw or more, satisfactory laser oscillation in the 583 nm band, which was the visible region, was confirmed. At this time, the oscillation efficiency was 20.3%. FIG. 4 is a graph showing a relationship between an input of the excitation beam and the oscillation output of the laser beam. FIG. 5 is a graph showing a relationship between a wavelength before and after oscillation of the laser beam and the output thereof. Note that the vertical axis of FIG. 5 is a relative output value with the peak as 1.

Example 2

In Example 2, the core of the amplification fiber had a composition of 0.93 wt % Dy, 0.40 wt % Al, and 2.18 wt % Ge. This amplification fiber was used in the laser beam emitting apparatus 1 according to Example 1 to emit an excitation beam in the visible region from the light source 2a.

Figure 6:
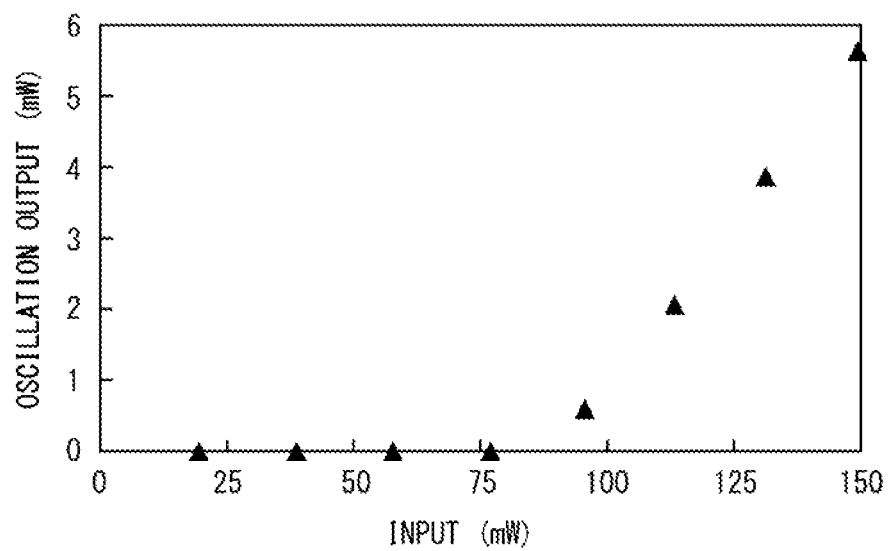
FIG. 6 is a graph showing a relationship between an input of an excitation beam and an oscillation output of a laser beam according to Example 2.
Figure 7:
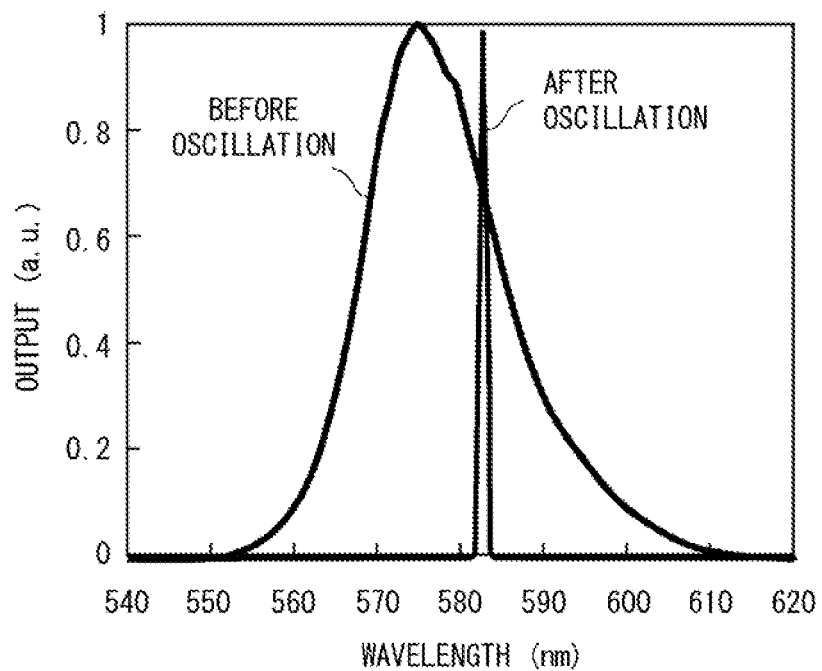
FIG. 7 is a graph showing a relationship between a wavelength before and after oscillation of the laser beam and the output thereof according to Example 2.

As a result, as shown in FIGS. 6 and 7, when the input of the excitation beam was 90 nw or more, satisfactory laser oscillation in the 583 nm band, which was the visible region, was confirmed. At this time, the oscillation efficiency was 9.8%. FIG. 6 is a graph showing a relationship between an input of the excitation beam and the oscillation output of the laser beam. FIG. 7 is a graph showing a relationship between a wavelength before and after oscillation of the laser beam and the output thereof. Note that the vertical axis of FIG. 7 is a relative output value with the peak as 1.

Examples 1 to 14

Next, Examples 3 to 14 and the above-described Examples 1 and 2 will be described together.

In Examples 1 to 14, the core of the amplification fiber had a composition of 0.07 to 0.93 wt % Dy. In addition, when Al, Ge, or P was included in the core, the composition of the core of the amplification fiber was 0.15 to 1.57 wt % Al, 0.88 to 9.68 wt % Ge, and 5.45 wt % P. In Examples 1 to 14, Tb was not added to the core of the amplification fiber. The amplification fiber was used in the laser beam emitting apparatus 1 according to the first embodiment to emit an excitation beam in the visible region from the light source 2a.

As a result, in each of Examples 1 to 14, when the input of the excitation beam was the predetermined value, satisfactory laser oscillation was confirmed in the predetermined wavelength band which was the visible region. Table 1 shows the composition and oscillation efficiency of the core of the amplification fiber according to each Example.

TABLE 1

|  | Dy (wt %) | Al (wt %) | Tb (wt %) | Ge (wt %) | P (wt %) | Oscillation efficiency (%) |
| --- | --- | --- | --- | --- | --- | --- |
| Example 6 | 0.28 | — | — | — | 5.45 | 4.2 |
| Example 7 | 0.40 | 1.57 | — | — | — | 3.7 |
| Example 3 | 0.53 | 0.55 | — | 1.48 | — | 15.8 |
| Example 4 | 0.38 | 0.52 | — | 1.63 | — | 14.1 |
| Example 5 | 0.40 | 0.45 | — | 3.74 | — | 20.5 |
| Example 2 | 0.93 | 0.40 | — | 2.18 | — | 9.8 |
| Example 1 | 0.46 | 0.54 | — | 1.80 | — | 20.3 |

TABLE 1-continued

|  | Dy (wt %) | Al (wt %) | Tb (wt %) | Ge (wt %) | P (wt %) | Oscillation efficiency (%) |
| --- | --- | --- | --- | --- | --- | --- |
| Example 8 | 0.37 | 0.38 | — | 9.68 | — | 14.1 |
| Example 9 | 0.73 | 0.65 | — | 8.91 | — | 16.3 |
| Example 10 | 0.46 | 0.57 | — | 2.35 | — | 22.2 |
| Example 11 | 0.46 | 0.53 | — | 3.29 | — | 28.2 |
| Example 12 | 0.26 | 0.43 | — | 1.74 | — | 27.9 |
| Example 13 | 0.21 | 0.34 | — | 0.88 | — | 19.3 |
| Example 14 | 0.07 | 0.15 | — | 1.00 | — | 16.1 |

As shown in Table 1, when the core of the amplification fiber included Al and Ge in addition to Dy, the oscillation efficiency was 10%, which was a satisfactory value. That is, when both Al and Ge were included in the core of the amplification fiber, satisfactory oscillation efficiency was obtained, which was preferable.

Next, the atomic ratios Al/Dy, Ge/Dy, and P/Dy of Examples 1 to 14 were calculated. Table 2 shows the calculated results. Max (combination) of the atomic ratios Al/Dy, Ge/Dy, P/Dy is a product of a quotient of the maximum value of the content of Al, Ge, or P of Examples 1 to 14 and the minimum value of the content of Dy of Examples 1 to 14 and the ratio of the atomic weight of Dy to Al, Ge, or P. Specifically, Max 135.1 of the atomic ratio Al/Dy is a product of a quotient of the content of Al 1.57 [wt %] of Example 7 and the content of Dy 0.07 [wt %] of Example 14 and the ratio of the Dy atomic weight 162.5 to the Al atomic weight 26.98. Max 309.5 of the atomic ratio Ge/Dy is a product of a quotient of the content of Ge 9.68 [wt %] of Example 8 and the content of Dy 0.07 [wt %] of Example 14 and the ratio of the Dy atomic weight 162.5 to the Ge atomic weight 72.61. Max 408.5 of the atomic ratio P/Dy is a product of a quotient of the content of P 5.45 [wt %] of Example 6 and the content of Dy 0.07 [wt %] of Example 14 and the ratio of the Dy atomic weight 162.5 to the P atomic weight 30.97.

TABLE 2

|  | Al/Dy | Ge/Dy | P/Dy |
| --- | --- | --- | --- |
| Example 6 | — | — | 102.1 |
| Example 7 | 23.6 | — | — |
| Example 3 | 6.3 | 6.2 | — |
| Example 4 | 8.2 | 9.6 | — |
| Example 5 | 6.8 | 20.9 | — |
| Example 1 | 2.6 | 5.2 | — |
| Example 2 | 7.1 | 8.8 | — |
| Example 8 | 6.2 | 58.6 | — |
| Example 9 | 5.4 | 27.3 | — |
| Example 10 | 7.5 | 11.4 | — |
| Example 11 | 6.9 | 16.0 | — |
| Example 12 | 10.0 | 15.0 | — |
| Example 13 | 9.8 | 9.4 | — |
| Example 14 | 12.6 | 32.0 | — |
| min | 0 | 0 | 0 |
| Max (combination) | 135.1 | 309.5 | 408.5 |

As shown in Tables 1 and 2, when the atomic ratios are Al/Dy: 0 to 135.1, Ge/Dy: 0 to 309.5, and P/Dy: 0 to 408.5, satisfactory laser oscillation could be confirmed in the predetermined wavelength band which was the visible region, if the input of the excitation beam was an appropriate value. When the atomic ratios are Al/Dy: 0 to 135.1, Ge/Dy: 0 to 309.5, and P/Dy: 0 to 408.5, satisfactory laser oscillation in the visible region could be confirmed, which was preferable.

Figure 9:
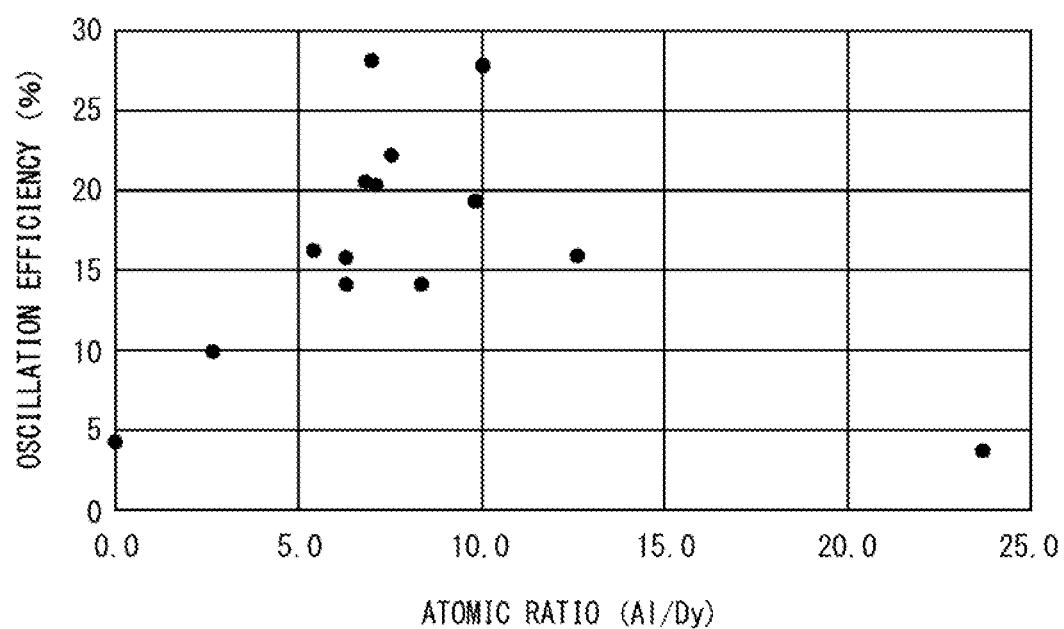
FIG. 9 is a graph showing a relationship between an atomic ratio Al/Dy and an oscillation efficiency.

Next, the relationship between the atomic ratio Al/Dy and the oscillation efficiency will be described with reference to FIG. 9. The atomic ratio Al/Dy and the oscillation efficiency of Examples 1 to 14 are shown in FIG. 9. As shown in FIG. 9, if the atomic ratio Al/Dy was within the predetermined range, the oscillation efficiency was mostly satisfactory. Specifically, when the atomic ratio Al/Dy was 2.6 or more and 23.6 or less, the oscillation efficiency was 10% or more, and thus stable laser oscillation could be performed, which was preferable. When the atomic ratio Al/Dy was 5.4 or more and 12.6 or less, the oscillation efficiency was 14% or more, which was more preferable. When the atomic ratio Al/Dy was 6.8 or more and 10.0 or less, the oscillation efficiency could have exceeded 20%, which was more preferable.

Figure 10:
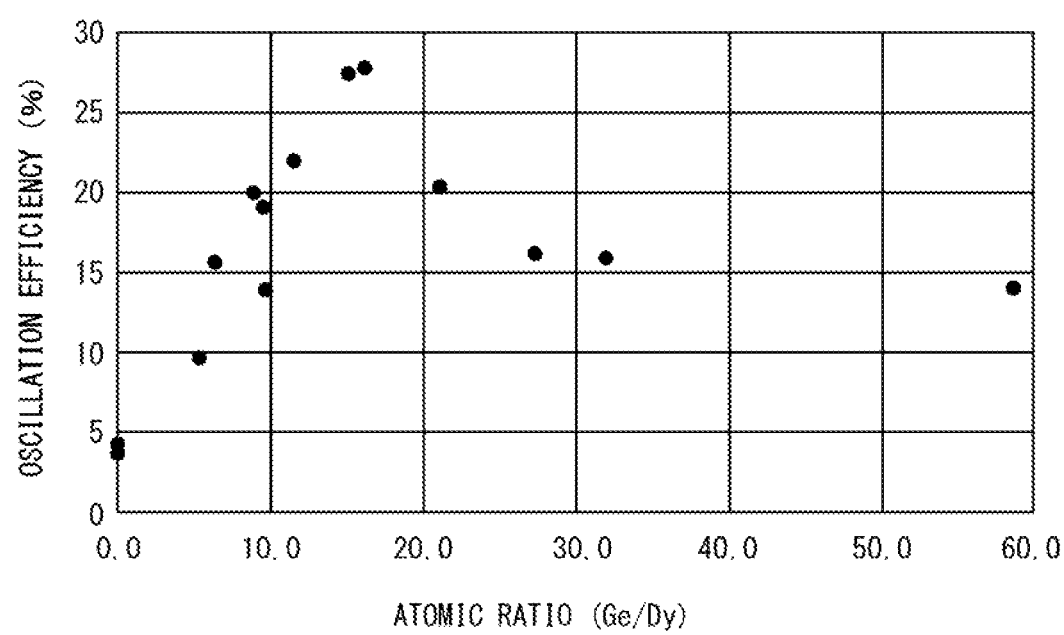
FIG. 10 is a graph showing a relationship between an atomic ratio Ge/Dy and the oscillation efficiency.

Next, the relationship between the atomic ratio Ge/Dy and the oscillation efficiency will be described with reference to FIG. 10. The atomic ratio Ge/Dy and the oscillation efficiency of Examples 1 to 14 are shown in FIG. 10. As shown in FIG. 10, if the atomic ratio Ge/Dy was within the predetermined range, the oscillation efficiency was mostly satisfactory. Specifically, when the atomic ratio Ge/Dy was 5.2 or more and 58.6 or less, the oscillation efficiency was 10% or more, and thus stable laser oscillation could be performed, which was preferable. When the atomic ratio Ge/Dy was 6.2 or more and 58.6 or less, the oscillation efficiency was 14% or more, which was preferable. When the atomic ratio Ge/Dy was 8.8 or more and 20.9 or less, the oscillation efficiency could have exceeded 20%, which was preferable.

<Relationship Between Atomic Ratio Al/Dy and Oscillation Efficiency>

Next, the reason why it is considered that the oscillation efficiency is satisfactory when the atomic ratio Al/Dy is limited within the predetermined range will be described.

As described above, Dy is a component that absorbs the excitation beams and outputs the laser beams by stimulated emission. The degree to which the laser beam of the Dy atom is output, i.e., the fluorescence cross section, varies depending on the environment surrounding the Dy atoms. In addition, Al is a component that suppresses aggregation of the Dy atoms and satisfactorily disperses the Dy atoms.

For this reason, when the atomic ratio Al/Dy is more than or equal to a lower limit value of the predetermined range, Al located around the Dy atom can be increased. When the number of Al atoms located around the Dy atoms increases, aggregation of the Dy atoms is suppressed, and the Dy atoms are satisfactorily dispersed in the silica glass which is the base material of the core. Thus, the fluorescence cross section due to Dy of the entire core is increased, which increases the output power of the laser beam. As described above, when the atomic ratio Al/Dy is more than or equal to the lower limit value of the predetermined range, the output power of the laser beam is increased, and the oscillation efficiency can have a satisfactory value.

On the other hand, when the atomic ratio Al/Dy is further increased, Al produces defects in the silica glass or causes the photodarkening. This may lead to lowering the oscillation efficiency. Therefore, when the atomic ratio Al/Dy is less than or equal to an upper limit value of the predetermined range, the defects and photodarkening caused by Al is suppressed, and the lowering of the oscillation efficiency is suppressed, which are preferable.

Thus, when the atomic ratio Al/Dy is limited within the predetermined range, the oscillation efficiency is satisfactory.

<Relationship Between Atomic Ratio Ge/Dy and Oscillation Efficiency>

Next, the reason why it is considered that the oscillation efficiency is satisfactory when the atomic ratio Ge/Dy is limited within the predetermined range will be described.

As described above, Ge is a component that suppresses the photodarkening. Further, Ge is less likely to generate defects in the silica glass than Al. The defects in the silica glass caused by Ge are less likely to adversely affect the oscillation efficiency as compared with the defects in the silica glass caused by Al.

Therefore, when the atomic ratio Ge/Dy is more than or equal to the lower limit value of the predetermined range, it is considered that a certain number of Ge located around the Dy atoms is ensured. The Ge atoms located around Dy atoms suppress the photodarkening. Further, Ge atoms located around the Dy atoms do not cause generation of defects in the silica glass as compared with Al, or even if the defects are generated in the silica glass due to the Ge atoms, the oscillation efficiency is not adversely affected so much. For this reason, when the atomic ratio Ge/Dy is more than or equal to the lower limit value of the predetermined range, the oscillation efficiency can have a satisfactory value.

On the other hand, when the atomic ratio Ge/Dy further increases to exceed the upper limit value of the predetermined range, structural defects in the silica glass caused by Ge are generated. This could cause the output of the laser beam to become unstable, and the oscillation efficiency to be lowered. Therefore, when the atomic ratio Ge/Dy is less than or equal to the upper limit value of the predetermined range, it is considered that structural defects and the photodarkening caused by Ge are suppressed, so that the lowering of the oscillation efficiency is suppressed, which is preferable.

Thus, when the atomic ratio Ge/Dy is limited within the predetermined range, the oscillation efficiency is satisfactory.

<Relationship Between the Oscillation Efficiency and the Contents of Al and Ge>

Next, as shown in Table 1, the reason why it is considered that when the core of the amplification fiber includes both Al and Ge, the oscillation efficiency is satisfactory will be described.

It is considered that when the core of the amplification fiber includes both Al and Ge, the Al and Ge atoms located around Dy are increased. Then, in addition to the defects caused by Al, defects caused by Ge can be generated in the silica glass. In such a case, since the cause of the defects is Al and Ge, it is considered that the adverse effect on the oscillation efficiency is small as compared with the case where the cause of the defect is only Al. Therefore, when the core of the amplification fiber includes both Al and Ge, the oscillation efficiency is satisfactory.

The present disclosure is not limited to the embodiments described above, and may be modified as appropriate without departing from the spirit of the disclosure.

Figure 8:
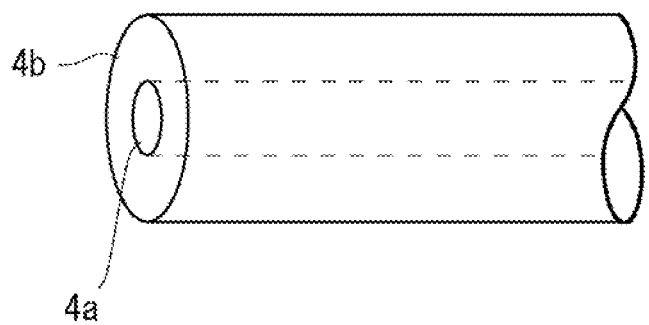
FIG. 8 shows a configuration of another amplification fiber.

The amplification fiber according to the above embodiments has a so-called double cladding structure including the first cladding 4b and the second cladding 4c. However, like an amplification fiber 41 shown in FIG. 8, the amplification fiber may have a so-called single cladding structure not including the second cladding 4c.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An amplification fiber comprising:
a core configured to generate a laser beam from an excitation beam in a visible region; and
a cladding surrounding the core, wherein
the core is composed of a core material comprising:
0.01 to 2 wt % Dy;
0.1 to 2 wt % Al,
1 to 10 wt % Ge, and
0 to 6 wt % P; and
a silica glass,
wherein atomic ratios of the core material are Al/Dy: 5.4 to 12.6 and Ge/Dy: 6.0 To 58.6.

2. The amplification fiber according to claim 1, wherein the core material further comprises one or more elements selected from Ce, F, and OH.

3. The amplification fiber according to claim 1, wherein the amplification fiber is configured to generate the laser beam including a wavelength band of 480 to 600 nm.

4. The amplification fiber according to claim 1, wherein the excitation beam includes a wavelength of 400 to 460 nm.

5. A laser beam emitting apparatus comprising:
a light source configured to emit an excitation beam in a visible region; and
the amplification fiber according to claim 1 through which the excitation beam passes to generate a laser beam.

6. The laser beam emitting apparatus according to claim 5, further comprising:
a first reflecting mirror disposed at one end of the amplification fiber; and
a second reflecting mirror disposed at another end of the amplification fiber to face the first reflecting mirror, wherein
the excitation beam passes through the amplification fiber to thereby generate the laser beam, and
the laser beam is repeatedly reflected between the first reflecting mirror and the second reflecting mirror to be oscillated.

7. The laser beam emitting apparatus according to claim 5, wherein
the light source is a blue laser diode configured to emit the excitation beam of 400 to 460 nm.

8. The laser beam emitting apparatus according to claim 5, wherein
the laser beam includes a wavelength band of 480 to 600 nm.

* * * * *